United States Patent
Yoon (10) Patent No.: US 8,547,337 B2
(45) Date of Patent: Oct. 1, 2013

(54) DEVICE FOR INPUTTING ENGLISH CHARACTERS FOR A MOBILE COMMUNICATION TERMINAL, AND METHOD FOR SAME

(76) Inventor: Ki-Sup Yoon, Seoul (KR)

(*) Notice: Subject to any disclaimer, the term of this patent is extended or adjusted under 35 U.S.C. 154(b) by 11 days.

(21) Appl. No.: 13/386,321

(22) PCT Filed: Jul. 16, 2010

(86) PCT No.: PCT/KR2010/004641
§ 371 (c)(1),
(2), (4) Date: Apr. 8, 2012

(87) PCT Pub. No.: WO2011/010835
PCT Pub. Date: Jan. 27, 2011

(65) Prior Publication Data
US 2012/0188168 A1 Jul. 26, 2012

(30) Foreign Application Priority Data
Jul. 23, 2009 (KR) .................. 10-2009-0067255

(51) Int. Cl.
*G06F 3/02* (2006.01)
(52) U.S. Cl.
USPC ........... 345/168; 345/156; 345/169; 345/172; 341/22; 341/23; 341/30; 715/780
(58) Field of Classification Search
USPC . 345/156, 168–169, 172, 173; 715/700–866; 341/22–35
See application file for complete search history.

(56) References Cited

U.S. PATENT DOCUMENTS 4,012,599 A * 3/1977 Meyer ..................... 379/93.18
6,005,495 A * 12/1999 Connolly et al. ............. 341/22
(Continued)

FOREIGN PATENT DOCUMENTS

JP 2003-122485 A 4/2003
KR 1020060057200 A 5/2006
(Continued)

*Primary Examiner* — Lun-Yi Lao
*Assistant Examiner* — Priyank Shah
(74) *Attorney, Agent, or Firm* — Kile Park Reed & Houtteman PLLC (57) ABSTRACT

According to the present invention, an alphabet input device of a mobile communication comprises a keypad input including a plurality of keys for inputting alphabets; a display for displaying alphabets inputted by said keypad input; an alphabet combiner for reading the alphabet corresponding to the input of the keypad input from pre-stored database and providing the display with said alphabet from said database; and, a controller coupled to said keypad input, said display and said alphabet combiner so as to control thereof, wherein said keypad input has a 3×4 matrix which includes numeric keys distinguished by the numbers '0' to '9' and function keys distinguished by the characters '*' and '#', and said numeric keys for '1 ' to '9' are assigned with a plurality of alphabet buttons for inputting alphabets, wherein said numeric key for '0' is assigned with a space button for inputting a blank, wherein one of said function keys for '*' and '#' is assigned with a last button for successive inputting of the alphabet and a special character button for inputting a special character, wherein the other of said function keys that does not assigned with said last button and said special character button is assigned with a shift button, which performs a function of character input mode-setting and word-shifting for setting a character input mode so as to allow inputting of the capital/small letter of alphabet and for shifting a word inputted beforehand between the capital letter and the small letter, and a function of character-shifting for shifting characters inputted beforehand one at a time.

14 Claims, 3 Drawing Sheets

(56) References Cited

U.S. PATENT DOCUMENTS

| | | | | |
|---|---|---|---|---|
| 6,043,761 | A * | 3/2000 | Burrell, IV | 341/23 |
| 6,184,803 | B1 * | 2/2001 | Burrell, IV | 341/22 |
| 6,232,892 | B1 * | 5/2001 | Burrell, IV | 341/22 |
| 6,346,894 | B1 * | 2/2002 | Connolly et al. | 341/22 |
| 6,765,556 | B2 * | 7/2004 | Kandogan et al. | 345/168 |
| 7,454,237 | B1 * | 11/2008 | Davis | 455/566 |
| 7,710,292 | B2 * | 5/2010 | Davies | 341/22 |
| 7,755,520 | B2 * | 7/2010 | Kandogan et al. | 341/22 |
| 2004/0056844 | A1 * | 3/2004 | Gutowitz et al. | 345/168 |
| 2007/0057822 | A1 * | 3/2007 | Davies | 341/22 |
| 2007/0074131 | A1 * | 3/2007 | Assadollahi | 715/816 |
| 2008/0162113 | A1 * | 7/2008 | Dargan | 704/3 |
| 2009/0046067 | A1 * | 2/2009 | In | 345/169 |

FOREIGN PATENT DOCUMENTS

| | | |
|---|---|---|
| KR | 100687234 B1 | 2/2007 |
| KR | 1020070079855 A | 8/2007 |
| KR | 1020080019410 A | 3/2008 |
| KR | 1020080034741 A | 4/2008 |

* cited by examiner

DEVICE FOR INPUTTING ENGLISH CHARACTERS FOR A MOBILE COMMUNICATION TERMINAL, AND METHOD FOR SAME

BACKGROUND OF THE INVENTION

1. Field of the Invention

The present invention relates to an alphabet input device of a mobile communication terminal and a method thereof, and more particularly to an alphabet input device of a mobile communication terminal and a method thereof, which make it possible to input alphabets more quickly by arranging the alphabets according to the frequency of use of the alphabets and the interrelationship of the successive input and which can have a keypad arrangement optimized to a singlehanded use by smoothing fast input of the alphabets assigned to the same button and by facilitating the shift of a word/character between a capital letter and a small letter, when trying to perform the input of the alphabets in the mobile communication terminal, such as a mobile phone, a PDA and etc.

2. Description of the Related Art

In general, alphabets for inputting character in English amount to 26 in total and words made by combining the alphabets amount to about 230,000. Accordingly, in order to input the alphabets in the mobile communication terminal using a 3×4 keypad, 26 alphabets are assigned, in the plural form, to the 12 keys.

Currently, the frequency of alphabet input in the mobile communication terminal increases along with the spread of the mobile phone, the PDA and a short message service, and thus, the alphabet input device and the method thereof have been disclosed, which allow the user to be accustomed to the alphabet input in an easier way and which minimize the number of button input manipulations.

Figure 1:
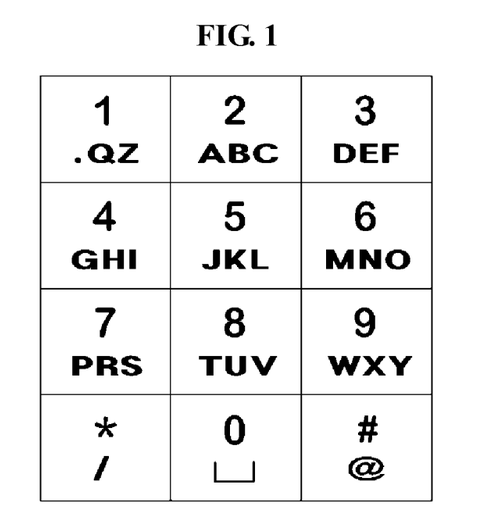
FIG. 1 is a view of a keypad for inputting alphabets according to a conventional mobile communication terminal.

FIG. 1 is a view of a keypad for inputting alphabet according to a conventional mobile communication terminal.

As shown in FIG. 1, the keypad for inputting alphabet according to the conventional mobile communication terminal is such that a plurality of the alphabet characters are assigned to 12 keys in the order of the alphabet itself, and thus the user may have such an advantage as to easily locate a place of the alphabet character. However, the frequency of use is not taken into account at all, and thus the conventional keypad has an unreasonable arrangement in that the larger amount of pressing is required for inputting the alphabet character with the higher frequency of use.

In other words, it is required to press the input button twice or three times so as to input the alphabets with the higher frequency of use, such as 'E', 'I', 'N', 'O' and 'S', whereas it is required to press the input button once or twice so as to input the alphabets with the lower frequency of use, such as 'J', 'Q' and 'X'. Accordingly, the character arrangement is inefficient in use.

Moreover, the relationship between alphabets requiring successive input is not taken into account at all. Thus, the manipulation of each input button increases when inputting the alphabets, such as 'TH', 'HE', 'IN' and 'ER', which are the succession of the alphabets with the higher frequency of use. Accordingly, it is difficult to quickly and successively input the alphabets.

In addition, when it is required to successively input the characters assigned to the same button, for example, when inputting 'AA', 'AB' or 'AC' using the button assigned with 'ABC', the user should, after inputting a first alphabet, await for a certain period of time (or an intermediate time) during which the cursor moves to a next character-place so as to input a second alphabet; otherwise, the user should manipulate a directional key to move the cursor to the next place so as to input the second alphabet. Therefore, it is impossible to perform the fast and successive input operation because of the increase in the moving distance of the finger and the slower input speed.

On the other hand, in case of the mobile communication terminal mainly used in the English-speaking countries, a function of shifting the alphabet between a capital letter and a small letter should be included in the button.

However, under the circumstance in which the shift function button should be pressed while inputting the alphabet, the user may fail to press the shift button before pressing the alphabet, because he/she pays too much attention to the spelling. In such a case, the conventional mobile communication terminal causes the inconvenience, because the cursor should be moved to a corresponding place so as to delete a corresponding alphabet by manipulating the directional key and then the corresponding alphabet should be inputted once again after pressing the shift function button.

Also, the user normally uses the above-described keypad of the mobile communication terminal with one hand. Accordingly, it is needed to enable the user to conveniently perform the alphabet input with one hand by arranging the alphabet input button and the function button in order to comply with the hand that the user mainly uses.

SUMMARY OF THE INVENTION

Accordingly, the present invention has been made to solve the above-mentioned problems occurring in the prior art, and the object of the present invention is to provide an alphabet input device of a mobile communication terminal and a method thereof, which make it possible to perform the successive input operation by arranging the alphabets in consideration of the frequency of use of the alphabets and the interrelationship of the successive input of the alphabets, when trying to input the alphabet in the mobile communication terminal, such as a mobile phone, a PDA and etc.

Also, the other object of the present invention is to provide an alphabet input device of a mobile communication terminal and a method thereof, which make it possible to quickly and successively input the alphabets assigned to the same button without any movement of the character-place through awaiting of the intermediate time or manipulation of the directional key.

Another object of the present invention is to provide an alphabet input device of a mobile communication terminal and a method thereof, which enable the shifting of an alphabet and a word between the capital letter and the small letter in a convenient and fast manner while inputting the alphabet without deletion and re-input of the character.

Another object of the present invention is to provide an alphabet input device of a mobile communication terminal and a method thereof, which can provide an keypad arrangement optimized to a single-handed use by assigning the button to a more convenient position according to the hand that the user mainly uses.

On the other hand, the objects of the present invention are not limited to those described herein-above, and another object of the invention that does not mentioned herein will be apparent to those skilled in the art by reading the detailed description detailed herein-below.

According to the present invention, an alphabet input device of a mobile communication terminal is provided, which comprises: a keypad input including a plurality of keys for inputting alphabets; a display for displaying alphabets inputted by said keypad input; an alphabet combiner for reading the alphabet corresponding to the input of the keypad input from pre-stored database and providing the display with said alphabet from said database; and, a controller coupled to said keypad input, said display and said alphabet combiner so as to control thereof, wherein said keypad input has a 3×4 matrix which includes numeric keys distinguished by the numbers '0' to '9' and function keys distinguished by the characters '*' and '#', and said numeric keys for '1' to '9' are assigned with a plurality of alphabet buttons for inputting alphabets, wherein said numeric key for '0' is assigned with a space button for inputting a blank, wherein one of said function keys for '*' and '#' is assigned with a last button for successive inputting of the alphabet and a special character button for inputting a special character, wherein the other of said function keys that does not assigned with said last button and said special character button is assigned with a shift button, which performs a function of character input mode-setting and word-shifting for setting a character input mode so as to allow inputting of the capital/small letter of alphabet and for shifting a word inputted beforehand between the capital letter and the small letter, and a function of character-shifting for shifting characters inputted beforehand one at a time.

Here, said plurality of the alphabet buttons are such that:

said numeric key for '1' is assigned with 'A', 'B' and 'C', so that 'A', 'B', 'C' and 'CA' are inputted according to the number of pressing; said numeric key for '2' is assigned with the alphabets 'E', 'F' and 'G', so that 'E', 'F', 'G' and 'GE' are inputted according to the number of pressing; said numeric key for '3' is assigned with the alphabets 'R', 'D' and 'X', so that 'R', 'D' and 'X' are inputted according to the number of pressing;

said numeric key for '4' is assigned with the alphabets 'I', 'J' and 'K', so that 'I', 'J', 'K' and 'KI' are inputted according to the number of pressing;

said numeric key for '5' is assigned with the alphabets 'O', 'P' and 'Q', so that 'O', 'P' and 'Q' are inputted according to the number of pressing;

said numeric key for '6' is assigned with the alphabets 'N', 'L' and 'M', so that 'N', 'L', 'M' and 'LL' are inputted according to the number of pressing;

said numeric key for '7' is assigned with the alphabets 'T' and 'H', so that 'T', 'H', 'TH' and 'HT' are inputted according to the number of pressing;

said numeric key for '8' is assigned with the alphabets 'S', 'W' and 'V', so that 'S', 'W' and 'V' are inputted according to the number of pressing; and, said numeric key for '9' is assigned with the alphabets 'U', 'Y' and 'Z', so that 'U', 'Y' and 'Z' are inputted according to the number of pressing.

According to the present invention, a method of inputting alphabet of a mobile communication terminal is provided, wherein said mobile communication terminal comprising:

a keypad input including a plurality of keys for inputting alphabets; a display for displaying alphabets inputted by said keypad input; an alphabet combiner for reading the alphabet corresponding to the input of the keypad input from pre-stored database and providing the display with said alphabet from said database; and, a controller coupled to said keypad input, said display and said alphabet combiner so as to control thereof, wherein said keypad input has a 3×4 matrix which includes numeric keys distinguished by the numbers '0' to '9' and function keys distinguished by the characters '*' and '#', and said numeric keys for '1' to '9' are assigned with a plurality of alphabet buttons for inputting alphabets, wherein said numeric key for '0' is assigned with a space button for inputting a blank, wherein one of said function keys for '*' and '#' is assigned with a last button for successive inputting of the alphabet and a special character button for inputting special character, wherein the other of said function keys that does not assigned with said last button and said special character button is assigned with a shift button, which performs a function of character input mode-setting and word-shifting for setting a character input mode so as to allow inputting of the capital/small letter of alphabet and for shifting a word inputted beforehand between the capital letter and the small letter, and a function of character-shifting for shifting characters inputted beforehand one at a time, said method comprising steps of:

a first step wherein said numeric key for '1' is assigned with 'A', 'B' and 'C', so that 'A', 'B', 'C' and 'CA' are inputted according to the number of pressing;

said numeric key for '2' is assigned with the alphabets 'E', 'F' and 'G', so that 'E', 'F', 'G' and 'GE' are inputted according to the number of pressing;

said numeric key for '3' is assigned with the alphabets 'R', 'D' and 'X', so that 'R', 'D' and 'X' are inputted according to the number of pressing;

said numeric key for '4' is assigned with the alphabets T, T and 'K', so that 'I', 'J', 'K' and 'KI' are inputted according to the number of pressing;

said numeric key for '5' is assigned with the alphabets 'O', 'P' and 'Q', so that 'O', 'P' and 'Q' are inputted according to the number of pressing;

said numeric key for '6' is assigned with the alphabets 'N', 'L' and 'M', so that 'N', 'L', 'M' and 'LL' are inputted according to the number of pressing;

said numeric key for '7' is assigned with the alphabets 'T' and 'H', so that 'T', 'H', 'TH' and 'HT' are inputted according to the number of pressing;

said numeric key for '8' is assigned with the alphabets 'S', 'W' and 'V', so that 'S', 'W' and 'V' are inputted according to the number of pressing; and said numeric key for '9' is assigned with the alphabets 'U', 'Y' and 'Z', so that 'U', 'Y' and 'Z' are inputted according to the number of pressing.

a second step of inputting a corresponding alphabet of a last-operated alphabet button in accordance with the number of pressing the last button when pressing the last button that is assigned to one of said function keys for '*' and '#';

a third step of shifting the alphabet or the word between the capital letter and the small letter and inputting thereof, when the input of the shift button, which is assigned to the other of the function keys that is not assigned with the last button, corresponds to the function of the character input mode-setting and the word-shifting;

a fourth step of individually shifting the alphabet at the left of the current cursor between the capital letter and the small letter when the input of the shift button corresponds to the function of the character-shifting;

a fifth step of executing a function of a blank-input when inputting the space button that is assigned to the numeric key for '0';

a sixth step of displaying a special character collection window when pressing and holding the special character button, for a few seconds, and causing a corresponding special character to be inputted when pressing a numeric key corresponding to one in the special character collection window, the special character button being assigned to one of said function keys for '*' and '#' along with the last button.

Advantage

According to the present invention, the successive and fast input operation of the alphabet is possible by arranging the alphabet button to the keypad in consideration of the frequency of use of the alphabet and the interrelationship of the successive input, when trying to input the alphabet in the mobile communication terminal, such as the mobile phone, the PDA and etc.

Also, with the use of the last button, it is possible to successively input the alphabets assigned to the same button in an easier and faster manner without any movement of the character-place through awaiting of the intermediate time or the manipulation of the directional key.

Further, with the use of the shift button, it is possible to conveniently and quickly perform the shift of the alphabet and the word between the capital letter and the small letter while inputting the alphabet without deletion and re-input of the character.

Furthermore, it is possible to provide the keypad arrangement optimized to a singlehanded use by assigning said last button and said shift button to the more convenient position of the function keys for '*' or '#' according to the hand that the user mainly uses when manipulating the mobile communication terminal.

The advantage of the present invention is not limited to the above-described advantages, and another advantage that does not described herein will be apparent to one of ordinary skill in the art from the recitations in the claims.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

Herein-below, a preferred embodiment of the present invention will be described in detail with reference to the drawings.

Figure 2:
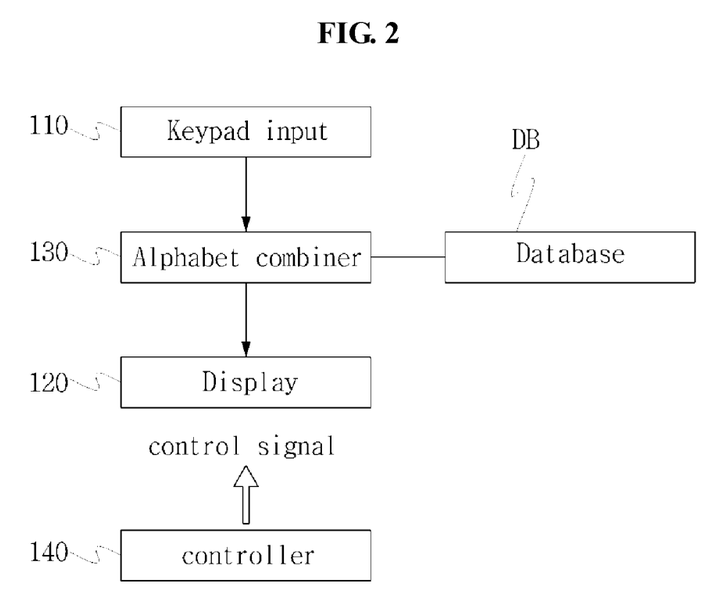
FIG. 2 is a block diagram illustrating an arrangement of an alphabet input device according to a preferred embodiment of the present invention.
Figure 3:
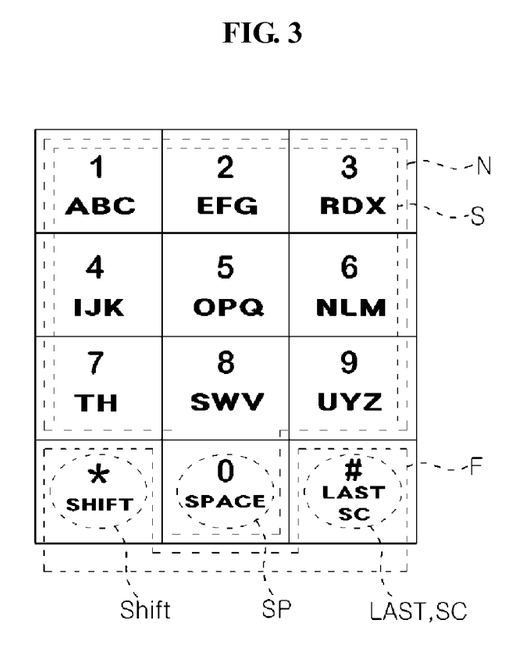
FIGS. 3 and 4 are views of keypad arrangements, which respectively illustrate the keypad inputs for a left-handed user (FIG. 3) and a right-handed user (FIG. 4) in the alphabet input device of the mobile communication terminal shown in FIG. 2.
Figure 4:
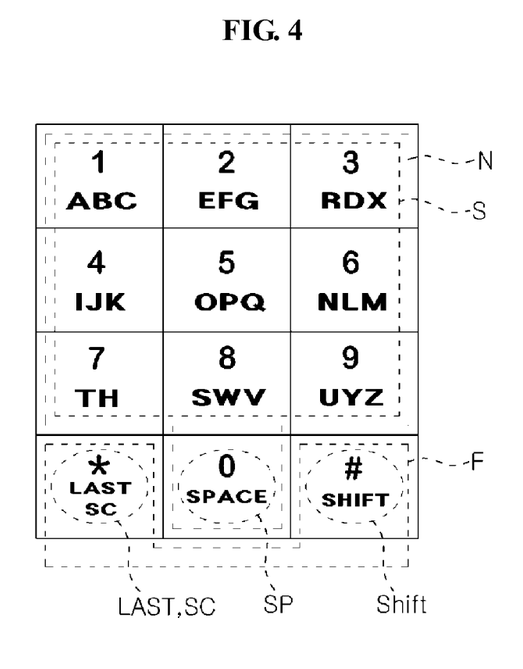

FIG. 2 is a block diagram illustrating the configuration of an alphabet input device of a mobile communication terminal according to a preferred embodiment of the present invention. FIGS. 3 and 4 respectively illustrate the keypad arrangements of the keypad inputs for a left-handed user (FIG. 3) and a right-handed user (FIG. 4), which are included in the alphabet input device of the mobile communication terminal shown in FIG. 2.

As illustrated in FIGS. 2-4, the alphabet input device of the mobile communication terminal according to the embodiment of the present invention comprises: a keypad input 110 including a plurality of keys for inputting the alphabet; a display 120 for displaying the alphabet inputted by the keypad 110; an alphabet combiner 130 for reading alphabet corresponding to the input of the keypad input 110 from pre-stored database and providing the display 120 with said alphabet read from the database; and a controller 140 coupled to said keypad input, said display, said alphabet combiner for control thereof.

The keypad input 110 has a 3 by 4 matrix consisting of numeric keys and function keys, wherein the numeric keys (N) are distinguished by the number '0' through the number '9' and the function keys are distinguished by the character '*' and the character '#'. A plurality of alphabet buttons (S) are assigned to the numeric keys (N) for '1' through '9'; a space button (SP) for inputting a blank is assigned to the numeric key (N) for '0'; a last button (LAST) for successive input of alphabets and a special character button (SC) for input of a special character are assigned to one of the function keys for '*' and '#'. A shift button (Shift) is assigned to the other of the function keys that is not assigned with the last button (LAST) and the special character button (SC). Here, the shift button (Shift) performs: the function of character input mode-setting and word-shifting, wherein the character input mode is set for enabling the input of a capital/small letter of the alphabet and a word inputted beforehand is shifted between the capital letter and the small letter; and the function of character-shifting, wherein characters inputted beforehand are shifted one at a time between the capital letter and the small letter.

With regard to said plurality of the alphabet buttons (S), the numeric key (N) for '1' is assigned with the alphabets 'A', 'B' and 'C', so that 'A', 'B', 'C' and 'CA' are inputted according to the number of pressing; the numeric key (N) for '2' is assigned with the alphabets 'E', 'F' and 'G', so that 'E', 'F', 'G' and 'GE' are inputted according to the number of pressing; and the numeric key (N) for '3' is assigned with the alphabets 'R', 'D' and 'X', so that 'R', 'D' and 'X' are inputted according to the number of pressing. The numeric key (N) for '4' is assigned with the alphabets 'I', 'J' and 'K', so that 'I', 'J', 'K' and 'KI' are inputted according to the number of pressing; the numeric key (N) for '5' is assigned with the alphabets 'O', 'P' and 'Q', so that 'O', 'P' and 'Q' are inputted according to the number of pressing; and the numeric key (N) for '6' is assigned with the alphabets 'N', 'L' and 'M', so that 'N', 'L', 'M' and 'LL' are inputted according to the number of pressing. Also, the numeric key (N) for '7' is assigned with the alphabets 'T' and 'H', so that 'T', 'H', 'TH' and 'HT' are inputted according to the number of pressing; the numeric key (N) for '8' is assigned with the alphabets 'S', 'W' and 'V', so that 'S', 'W' and 'V' are inputted according to the number of pressing; and the numeric key (N) for '9' is assigned with the alphabets 'U', 'Y' and 'Z', so that 'U', 'Y' and 'Z' are inputted according to the number of pressing.

The alphabets inputted using said plurality of the alphabet buttons (S) are illustrated in Table 1 below.

TABLE 1

[Alphabets inputted according to the number of pressing the plurality of the alphabet buttons]

| Number of numeric key | 1 | | | | 2 | | | | 3 | | | |
|---|---|---|---|---|---|---|---|---|---|---|---|---|
| Number of pressing | 1 | 2 | 3 | 4 | 1 | 2 | 3 | 4 | 1 | 2 | 3 | 4 |
| Inputted character | A | B | C | CA | E | F | G | GE | R | D | X | |

| Number of numeric key | 4 | | | | 5 | | | | 6 | | | |
|---|---|---|---|---|---|---|---|---|---|---|---|---|
| Number of pressing | 1 | 2 | 3 | 4 | 1 | 2 | 3 | | 1 | 2 | 3 | 4 |
| Inputted character | I | J | K | KI | O | P | Q | | N | L | M | LL |

| Number of numeric key | 7 | | | | 8 | | | 9 | | |
|---|---|---|---|---|---|---|---|---|---|---|
| Number of pressing | 1 | 2 | 3 | 4 | 1 | 2 | 3 | 1 | 2 | 3 |
| Inputted character | T | H | TH | HT | S | W | V | U | Y | Z |

As may be appreciated from Table 1, said plurality of the alphabet buttons (S) are divided into alphabets with the higher frequency of use and alphabets with the lower frequency of use with regard to word combination using said alphabets. Accordingly, the alphabet buttons are arranged to reduce the number of pressing for the alphabets with high frequency of use and to increase the number of pressing for the alphabets with relatively low frequency of use. Table 2 indicates the frequency of use of each alphabet.

TABLE 2

[Frequency of use of each alphabet]

| | |
|---|---|
| a | 8.17% |
| b | 1.49% |
| c | 2.78% |
| d | 4.25% |
| e | 12.70% |
| f | 2.23% |
| g | 2.01% |
| h | 6.09% |
| i | 6.97% |

TABLE 2-continued

[Frequency of use of each alphabet]

| | |
|---|---|
| j | 0.15% |
| k | 0.77% |
| l | 4.03% |
| M | 2.41% |
| N | 6.74% |
| O | 7.51% |
| P | 1.93% |
| q | 0.10% |
| R | 5.99% |
| s | 6.33% |
| T | 9.06% |
| u | 2.76% |
| v | 0.98% |
| w | 2.36% |
| x | 0.15% |
| y | 1.97% |
| z | 0.07% |

As indicated in Table 2, the alphabet with high frequency of use comprise 'A', 'E', 'I', 'N', 'O', 'R', 'S', 'T' and 'U'.

Thus, as in the said plurality of the alphabet buttons (S), each of the alphabets with high frequency of use, such as 'A', 'E', 'I', 'N', 'O', 'R', 'S', 'T' and 'U' is assigned to a first place of a corresponding numeric key (N) to thereby enable the user to input the alphabet with a single manipulation of the input button. A second place and a third place of the corresponding numeric key are assigned with the alphabets in such a manner that the basic order of the alphabet is observed, so that it is possible to attain the key arrangement enabling the user to simply and conveniently discern and memorize the position of the corresponding alphabet.

Also, said plurality of the alphabet buttons (S) are adjusted in their arrangement in such a manner that the alphabet combination with the higher interrelationship of the successive input can be inputted in a more convenient manner than the alphabet combination with the lower interrelationship of the successive input by examining the interrelationship of the successive-inputted alphabet combination in case of the word combination using the alphabets.

In the present invention, it is intended to use the statistic regarding the Bigram so as to take the interrelationship of the successive input of the alphabets into account. The Bigram means two successive alphabets and there are 676 (26×26) Bigrams in total. In consideration of the keypad configuration, 2 or 3 alphabet characters are assigned to a single button. In a multi tap-type keypad, the button should be pressed 1 to 3 times so as to input a single character. The button should be pressed 2 to 6 times so as to input Bigram.

If an important Bigram is preferentially taken into account with reference to the frequency of Bigram for the purpose of (1) reducing the number of the button pressing at the time of the input and of (2) preventing two alphabets from being assigned to the same button, it is possible to attain a smoother connection when inputting the successive alphabets.

TABLE 3

List of Bigram with high frequency of use

| BIGRAM | FOU | N.P. Co | In | BIGRAM | FOU | N.P. Con. | In | BIGRAM | FOU | N.P. Co | In | BIGRAM | FOU | N.P. Co | In |
|---|---|---|---|---|---|---|---|---|---|---|---|---|---|---|---|
| TH | 4.13 | 3 | 3# | SE | 0.91 | 5 | 2 | UT | 0.52 | 3# | 2 | IM | 0.37 | 4 | 4 |
| HE | 3.74 | 4 | 3 | VE | 0.89 | 5 | 4 | AD | 0.52 | 2 | 3 | CA | 0.36 | 4# | 4# |
| IN | 2.84 | 5 | 2 | AL | 0.88 | 3 | 3 | WI | 0.52 | 4 | 3 | UL | 0.36 | 5 | 3 |
| OF | 2.48 | 6 | 3 | ME | 0.85 | 3 | 4 | US | 0.52 | 5 | 2 | AC | 0.35 | 4# | 4# |
| AN | 2.40 | 3 | 2 | BE | 0.83 | 4 | 2 | EL | 0.51 | 5 | 3 | DI | 0.35 | 4 | 3 |
| ER | 2.28 | 4 | 2 | LL | 0.82 | 6# | 4# | MA | 0.51 | 2 | 4 | LD | 0.35 | 4 | 4 |
| RE | 1.95 | 4 | 2 | LE | 0.80 | 5 | 3 | OT | 0.50 | 4 | 2 | RS | 0.35 | 5# | 2 |

TABLE 3-continued

List of Bigram with high frequency of use

| | | | | | | | | | | | | | | | |
|---|---|---|---|---|---|---|---|---|---|---|---|---|---|---|---|
| ND | 1.62 | 3 | 3 | EA | 0.78 | 3 | 2 | UR | 0.50 | 4 | 2 | SS | 0.34 | 6# | 2# |
| OR | 1.56 | 5 | 2 | FO | 0.77 | 6 | 3 | EE | 0.47 | 4# | 2# | IR | 0.33 | 5 | 2 |
| ON | 1.54 | 5# | 2 | NT | 0.77 | 3 | 2 | IC | 0.47 | 6 | 4 | GH | 0.33 | 3# | 5 |
| IS | 1.38 | 6 | 2 | TI | 0.73 | 4 | 2 | SO | 0.45 | 6 | 2 | KE | 0.33 | 4 | 4 |
| OU | 1.33 | 5 | 2 | WE | 0.68 | 3 | 3 | IO | 0.44 | 6 | 2 | EM | 0.33 | 3 | 4 |
| AT | 1.28 | 2 | 2 | DE | 0.67 | 3# | 3 | SH | 0.43 | 5 | 3 | ID | 0.32 | 4 | 3 |
| EN | 1.26 | 4 | 2 | NE | 0.66 | 4 | 2 | RA | 0.43 | 3 | 2 | YO | 0.32 | 6 | 3 |
| AS | 1.26 | 4 | 2 | RO | 0.62 | 5 | 2 | OW | 0.42 | 4 | 3 | MO | 0.31 | 4# | 4 |
| HA | 1.25 | 3 | 3 | WA | 0.59 | 2 | 3 | IL | 0.42 | 6 | 3 | EC | 0.31 | 5 | 4 |
| TO | 1.23 | 4 | 2 | OM | 0.59 | 4# | 4 | LA | 0.41 | 4 | 3 | RT | 0.31 | 3 | 2 |
| ED | 1.16 | 3# | 3 | HO | 0.59 | 5 | 3 | AI | 0.41 | 4 | 2 | GE | 0.31 | 3 | 4# |
| IT | 1.13 | 4 | 2 | CO | 0.58 | 6 | 4 | LY | 0.40 | 6 | 4 | NC | 0.31 | 5 | 4 |
| HI | 1.12 | 5# | 3 | NO | 0.57 | 5# | 2 | ET | 0.39 | 3 | 2 | TR | 0.31 | 3 | 2 |
| AR | 0.96 | 3 | 2 | CE | 0.56 | 5 | 4 | PE | 0.39 | 3 | 3 | OO | 0.30 | 6# | 2# |
| TE | 0.93 | 3 | 2 | LI | 0.55 | 6 | 3 | LO | 0.38 | 6 | 3 | AY | 0.30 | 4 | 3 |
| NG | 0.93 | 3 | 4 | RI | 0.54 | 5 | 2 | SI | 0.38 | 6 | 2 | PR | 0.30 | 3# | 3 |
| ES | 0.93 | 5 | 2 | WH | 0.54 | 3 | 4 | TA | 0.37 | 2 | 2 | SA | 0.30 | 4 | 2 |
| ST | 0.92 | 4 | 2 | CH | 0.53 | 5 | 5 | UN | 0.37 | 4 | 2 | NS | 0.29 | 5 | 2 |

Statistics of the data

| | 2 pressings | 3 pressings | 4 pressings | 5 pressings | 6 pressings | Case of two character assigned to the same button(#) |
|---|---|---|---|---|---|---|
| CO | 5 | 25 | 30 | 24 | 16 | 17 |
| IN | 47 | 30 | 21 | 2 | 0 | 8 |

[Remark]
FOU: Frequency ratio of use
NP: Number of pressing
Co: the Conventional art
In: The present invention
case of two characters assigned to the same button Table 3 indicates the list of Bigram which has the higher frequency of use. When comparing to the conventional scheme, it is arranged that the number of the button pressing decreases as a whole, and that the Bigram of great importance may be inputted in an easier way. Particularly, 47 Bigrams out of 100 can be inputted by pressing the button twice only.

In Table 3, the mark "#" indicates the case in that two alphabets of the Bigram are assigned to the same button. While there are 17 examples of the Bigram assigned to the same button in the conventional art, the present invention shows 8 examples of the Bigram assigned to the same button. Specifically, 'TH', 'LL', 'EE', 'CA', 'AC', 'SS', 'GE' and 'OO' are included in such examples. Here, 4 examples, such as 'LL', 'SS', 'EE' and 'OO' are the repetition of the same alphabet, and thus it cannot be solved by adjusting the button arrangement. The case in that two different alphabets are assigned to the same button comprises 4 examples, such as 'TH', 'CA', 'AC', 'GE'.

'TH' does not only have the highest frequency of use among the Bigrams, but it is also most frequently used in an initial part of a word, as in 'This', 'That', 'They', 'There', 'These', 'Those', 'Thing', 'Think', 'Through', 'Though' and etc.

Accordingly, for the purpose of the easer input, 'TH' can be entered by pressing the numeric key (N) for '7' three times in succession, wherein the numeric key (N) for '7' is assigned with 'T' button and 'H' button among said plurality of the alphabet buttons (S). In such a case, it is possible to input 'TH' by pressing once the numeric key (N) for '7' so as to input 'T', moving a cursor to a next position through the operation of a directional key or waiting of the intermediate time, and then pressing twice the numeric key (N) for '7' so as to input 'H'. However, because 'TH' is the Bigram that is most repeatedly used, it is also possible to input 'TH' by successively pressing the numeric key (N) for '7' three times without the operation of the directional key or the waiting of the intermediate time, to thereby enable the habitual input.

According to the plurality of the alphabet buttons (S), 'LL', 'CA', 'GE', 'KI', and 'HT' are entered by respectively pressing the numeric key (N) for '6', '1', '2', '4' and '7' four times in succession, wherein 'LL', 'CA', 'GE' are the Bigrams with the higher frequency of use as indicated in Table 3, and wherein 'KI' and 'HT' are frequently used, but not indicated in Table 3. Thereby, a moving distance of a finger can be minimized when inputting the alphabets, so that it is possible to successively input the alphabets without delay.

As described herein above, the arrangement of the alphabets assigned to the button is adjusted with regard to the Bigrams with the higher frequency of use to thereby reduce the frequency of input occurrence. However, since 26 alphabets are assigned to 12 buttons, it is impossible to completely prevent the situation in that different alphabets assigned to the same button are pressed in succession. Also, the case often occurs in that the same alphabet should be pressed in succession. In that case, the adjustment of the button arrangement cannot solve the problem. In order to address this problem, a last button (LAST) will be provided as described hereinbelow.

The last button (LAST) is assigned to any one of the function keys for '*' and '#' and serves to facilitate the successive input of the alphabets assigned to the same button. In the operation of the last button, the last-pressed alphabet button (S) is memorized, and then a corresponding alphabet of the last-pressed alphabet button (S) is inputted in accordance with the number of pressing when the user presses the last button (LAST).

In the conventional manner, if it is required to input 'AB' by successively inputting different alphabets assigned to the same button, the user presses the numeric key (N) for '2' once to thereby input 'A', and then waits for a certain period of the time (or the intermediate time) until the cursor moves to a next place for a following character. Then, the user can press the numeric key (N) for '2' twice in succession, to thereby input 'B'. Otherwise, the user presses the numeric button (N) for '2' once to thereby input 'A', moves the cursor to the next place for a following character by manipulating the directional key, and then presses the numeric key (N) for '2' twice in succession to thereby input 'B'. Therefore, the continuity and the rhythm in the alphabet input is degraded, because the waiting of the intermediate time is needed while inputting the alphabets or because the moving distance of the finger increases while operating the directional key.

In contrast to the conventional manner, the input button pressed last by the user is memorized, and then, when the user presses the last button (LAST), the alphabet assigned to the last-pressed button can be inputted in accordance with the number of pressing. In other words, the alphabets assigned to the alphabet button (S) are memorized at the same time as any alphabet button (S) of the numeric keys for '1' through '9' assigned with the corresponding alphabets is inputted.

For example, when the alphabet button (S) assigned to the numeric key (N) for '1' is inputted so as to input 'a', the alphabet button (S) of the numeric key (N) for '1' assigned with 'a' and the last button (LAST) have the same setting. Accordingly, it is possible to input 'a' when pressing the last button (LAST) once; it is possible to input 'b' when pressing the last button (LAST) twice; and it is possible to input 'c' when pressing the last button three times.

In the conventional manner, when it is required to input "aba", it comprises steps of: pressing the alphabet button (S) assigned to the numeric key (N) for '2' once; moving the cursor through the waiting of the intermediate time or the manipulation of the directional key; pressing the alphabet button (S) assigned to the numeric key (N) for '2' twice in succession; moving the cursor through the waiting of the intermediate time or the manipulation of the directional key; and pressing the alphabet button (S) assigned to the numeric key (N) for '2' once.

In the present invention, however, if it is required to input "aba", it includes steps of: pressing the alphabet button (S) assigned to the numeric key (N) for '1' once; pressing the last button (LAST) twice; pressing the alphabet button (S) assigned to the numeric key (N) for '1' once.

Here, the last button (LAST) memorizes a corresponding setting every time the alphabet button (S) assigned to each of the numeric keys (N) for '1' to '9' is pressed. Specifically, if it is required to input "apart", the last button (LAST) is set as the alphabet button (S) assigned to the numeric key (N) for '1' at the same time as the user presses the alphabet button (S) assigned to the numeric key (N) for '1' so as to input 'a'; the last button (LAST) is set as the alphabet button (S) assigned to the numeric key (N) for '5' at the same time as the user presses the alphabet button (S) assigned to the numeric key (N) for '5' so as to input 'p'; the last button (LAST) is set as the alphabet button (S) assigned to the numeric key (N) for '1' at the same time as the user presses the alphabet button (S) assigned to the numeric key (N) for '1' so as to input 'a'; the last button (LAST) is set as the alphabet button (S) assigned to the numeric key (N) for '3' at the same time as the user presses the alphabet button (S) assigned to the numeric key (N) for '3' so as to input 'r'; and the last button (LAST) is set as the alphabet button (S) assigned to the numeric key (N) for '7' at the same time as the user presses the alphabet button (S) assigned to the numeric key (N) for '7' so as to input 't'.

Accordingly, with the use of the last button (LAST), the last-pressed input button is memorized, and then the corresponding alphabet of the last-pressed input button can be inputted in accordance with the number of pressing the last button (LAST) while the user manipulates the last button (LAST). Thereby, when it is required to input the alphabets assigned to the same button, the waiting of the intermediate time or the increase in the moving distance of the finger due to the manipulation of the directional key can be prevented, and thus it is possible to input the alphabets in a continuous and rhythmical manner. Here, if the user does not want to use the last button (LAST) of the present invention, the present invention preferably allows to input the alphabets through the waiting of the intermediate time or the manipulation of the directional key.

On the other hand, along with a cellular phone-terminal having the 3×4 keypad, a cellular-phone terminal in the form of a smart phone is also widely used, which has a touch-screen display on an entire front-face thereof, but not the 3×4 keypad. The smart phone adopts as an input device a hardware type-QWERTY keyboard, a software type-QWERTY keyboard, a software type-3×4 keypad and etc. The way of operating the input device as a software type means that a corresponding input device is displayed on a touch screen of the smart phone and that the input operation may be attained by touching the touch screen. If the 3×4 alphabet keypad of the present invention is adopted in the smart phone, the alphabets assigned to each button may be changed midway for display because the keys are not printed, but displayed on the screen. Accordingly, instead of displaying the last button (LAST) as 'LAST', the input button memorized in the last button (LAST) can be directly displayed as shown below. Thus, the user may grasp/determine the last-operated button and input the alphabet in an easier way.

[Display of the Last Button after Pressing the Button for 'ABC' & SWV on a Touch Screen Display]

| 1<br>ABC | 2<br>EFG | 3<br>RDX |
|---|---|---|
| 4<br>IJK | 5<br>OPQ | 6<br>NLM |
| 7<br>TH | 8<br>SWV | 9<br>UYZ |
| *<br>ABC | 0<br>SPACE | #<br>SHIFT |

| 1<br>ABC | 2<br>EFG | 3<br>RDX |
|---|---|---|
| 4<br>IJK | 5<br>OPQ | 6<br>NLM |
| 7<br>TH | 8<br>SWV | 9<br>UYZ |
| *<br>SWV | 0<br>SPACE | #<br>SHIFT |

The shift button (Shift) is assigned to the other function key that is not assigned with the last button (LAST) and the special character button (SC). In other words, if the last button (LAST) and the special character button (SC) are assigned to '*' of the function keys (F), the shift button (Shift) is assigned to '#'. The shift button (Shift) performs: a function of character input mode-setting and word-shifting, wherein the character input mode is set for enabling the input of alphabet capital/small letter and wherein the shift between the capital letter and the small letter is available for a word inputted beforehand; and a function of character shifting, wherein the alphabets inputted beforehand shift between the capital letter and the small letter one at a time.

In general, the character input modes of the mobile communication terminal mainly used in the English-speaking countries includes: an 'abc mode' in which all the alphabets are inputted as the small letter; an 'Abc mode' in which an initial letter is inputted as the capital letter and the remaining letters as the small letter; and an 'ABC' mode in which all the alphabets are inputted as the capital letter. If it is intended to perform input in a certain input mode, it is necessary to change the character input mode before inputting the character. Also, once inputted, it is impossible to shift the character between the capital letter and the small letter.

In the conventional manner, at the time of initiating the input, the user should determine whether he/she uses the capital letter or the small letter at the same time as he/she pays attention to the spelling. Thus, the user may be confused if he/she is not accustomed to the character input. Particularly, the user is apt to make such a mistake as initiating the input without setting the capital/small letter input mode. In that case, it is troublesome to delete an erroneous input-part, to set the capital/small character input mode, and to restart input.

The present invention uses three modes of the capital/small letter input, which includes the 'Abc mode', the 'ABC mode' and the 'abc mode' similar to the conventional manner. The 'abc mode' is set as a default mode and the 'Abc mode' is set at the beginning of the text message.

The function of character input mode-setting and word-shifting is arranged in such a manner that the input mode circulates in the order of the 'abc mode'(the default setting) →the 'Abc mode'→the 'ABC mode'→the 'abc mode'→the 'Abc mode'→the 'ABC mode' as the user presses the shift button (Shift). When the shift button (Shift) is pressed, the character input mode is set, so that the cursor awaits the character input so as to display a new input-character on the screen according to the corresponding mode. Further, if there is a word inputted beforehand at a left/right side of the cursor when pressing the shift button (Shift), the word shifts automatically according to the corresponding mode.

The function of character input mode-setting and word-shifting affects a new input-character and a character inputted beforehand within a range of a single word. Accordingly, no matter when the user presses the shift button (Shift), in other words, regardless of whether the user presses the shift button (Shift) before, after or during inputting the word, the same result is obtained. Also, the capital/small letter-shifting can be attained by pressing the shift button (Shift) when returning to the position of the corresponding word after completing the sentence. With the use of such function, the conventional inconvenience requiring the re-input of the character after deletion can be avoided, and thus it is possible to set and modify the capital/small letter-presentation in a free and easy way.

The range within which the word shifting is executed when pressing the shift button (Shift) is from a position just behind the first character of a word to a position just behind the last character. A position just before the first character is excluded so as to prepare for the case in that a new word is inserted in front of an existing word. In case of the word like 'ROBOT', the position just before 'R' is excluded. If the user presses the shift button (Shift) when the cursor is positioned within the range between the position just behind 'R' and the position just behind 'T', the 'ROBOT' shifts according to the corresponding mode. A word is separated by a space character. If a special character is used in the middle of the word constituted by the alphabets, the word is regarded as being separated into each word by the special character.

In the conventional manner, if it is required to input the 'ROBOT', the character input mode is set as the 'ABC mode' and then the corresponding alphabets are inputted. However, if 'robot' is inputted instead of the 'ROBOT' because the user fails to set the 'ABC mode', it is required to delete the 'robot' as a whole, to set the shift mode as the 'ABC mode', and then to input the 'ROBOT' once again.

In the present invention, the character input mode is set as the 'ABC mode' by pressing the shift button twice, and then the corresponding alphabets are inputted to thereby complete the 'ROBOT', like the conventional manner.

Additionally, when the cursor lies at the position just behind the last character of the word 't' after finishing the input of the 'robot', the word 'robot' may be shifted to 'ROBOT' of the 'ABC mode' by pressing the shift button (Shift) twice.

Furthermore, if the user presses the shift button (Shift) twice in a state that only the 'rob' is inputted while trying to input the 'ROBOT', the 'rob' at a left side of the cursor is shifted to 'ROB' of the 'ABC mode' and the character input mode is set as the 'ABC mode'. Thereby, when 'o' and 't' are newly inputted, the 'ROBOT' can be completed.

Also, after completing a sentence like 'This robot is mine', the user moves the cursor between the position just behind 'r' of the word 'robot' and position just behind 't', and then presses the shift button (Shift) twice to thereby shift the sentence to 'This ROBOT is mine'.

While inputting the text message, the position of the cursor may change due to pressing of the space button, the directional key and the delete button which are used along with the alphabet input buttons. Here, a situation may occur in which the character input mode should be shifted before inputting a next character depending on a state at a right/left side of the cursor. Here, in order to facilitate the input, it is necessary to include a function of automatic shifting and setting of the character input mode according to each situation.

When the cursor changes in its position due to the pressing of the space button or the directional key, the character input mode is automatically set as the 'ABC mode' and the word does not shift in the following three cases: a single character at the left side of the cursor and a single character at the right side of the cursor are the capital letters; the special character, the space character or the initiation of the text message lies at the left side of the cursor and double characters at the right side of the cursor are capital letters; and double characters at the left side of the cursor are the capital letters and the special character, the space character or the termination of the text message lies at the right of the cursor.

When the cursor changes in its position due to the pressing of the space button or the directional key, the character input mode is automatically set as the 'Abc mode' and the word does not shift in the following two cases: the left side of the cursor corresponds to the initiation of the text message; and a string located at the left side of the cursor is arranged in the order of one of the special characters such as '.', '?' and '!', each of which means the termination of the sentence, followed by one or more of the space characters.

If the case of setting as the 'ABC mode' and the case of setting as the 'Abc mode' occur at the same time, the 'ABC mode' is preferentially applied. Also, if neither the case of setting as the 'ABC mode' nor the case of setting as the 'Abc mode' occurs, it is automatically set as the 'abc mode' and the word does not shift.

For instance, if the user omits 'O' to thereby input 'ROBT' in spite of trial to input the 'ROBOT', the character input mode is automatically set as the 'ABC mode' by moving the cursor between 'B' and 'T', and thus the 'ROBOT' is displayed by inputting 'O' without any need to separately set the character input mode. Also, if it is required to input a plural sentences like "I'm fine. Thank you.", the character input mode is automatically shifted to the 'Abc mode' when the space button and the special character indicating the termination of the sentence are inputted. Accordingly, it is possible to proceed with the input operation without any further manipulation.

Also, when the delete button is pressed to thereby delete the character and change the cursor in its position, the character deletion is made within a single word before deleting the space character or the special character, and thus the character input mode does not shift in its setting so as to enable the input operation to proceed in the same mode. After the space character or the special character is deleted by successively pressing the delete button, the character input mode-setting that is currently applied cannot affect the word being inputted. Accordingly, the same rule is applied as in the shifting according to the pressing of the space button and the directional key. The successive pressing of the delete button corresponds to the case in that only the delete button is successively pressed without other button being pressed, wherein it is determined as the successive pressing of the delete button if there is not any manipulation of other button in spite of the occurrence of the interval during the successive input.

If the character input mode is set as the 'ABC mode' when the special character is inputted, the character input mode does not shift in its setting. Except for this case, the character input mode is automatically set as the 'abc' mode and the word does not shift. For instance, if the input operation begins after setting 'ABC' mode so as to input an abbreviation, such as U.S., N.Y., L.A. etc., it is possible to perform the input operation in a continuous manner without shifting the character input mode, even when the special character "." is inputted in the middle of a word.

With the use of the function of character input mode-setting and word-shifting, it is possible to complete the word in advance in consideration of the spelling and then to shift the corresponding word between the capital letter and the small letter, without simultaneously considering the spelling and the capital/small letter-shifting in the conventional manner. The manner of the present invention enables the user, who is not accustomed to the alphabet input, to compose the message in a simple and easy way.

As an example of inputting a sentence for a text message, the 'Abc mode' is set at the initiation of the text message, and thus 'Korea' is inputted in the 'Abc mode' when the user inputs 'korea'. If the shift button (Shift) is pressed once during the time when the cursor lies at a position just behind 'a', in other words, just behind the last alphabet of the 'Korea', the 'Korea' shifts to 'KOREA'. Afterward, if the space character is inputted after the 'KOREA', a blank is inputted and the character input mode is set as the 'abc mode'. Thereafter, if 'is edward' is inputted and then the shift button (Shift) is pressed once during the time when the cursor lies just behind 'd', in other words, just behind the last alphabet of the 'edward', the 'KOREA is edward' is shifted to 'KOREA is Edward'. Also, if ''s country' is inputted behind the 'KOREA is Edward', the character input mode is automatically set as the 'abc mode' due to the input of the special character, such as,' (i.e., apostrophe), so that 'KOREA is Edwards's country' is inputted.

In the present invention, both the manner of inputting the characters after setting the character input mode in advance like the conventional manner and the manner of inputting the characters followed by shifting the word unlike the conventional manner can be used, so that the user may select either one of these two manners, which is more familiar to him/her.

If it is required to additionally input a new alphabet or a new word to the sentence completed beforehand, for instance, if it is required to input 'NEW' between 'a' and 'robot!' after completing the sentence 'I bought a robot!', the user moves the cursor to the position just before 'r' of the 'robot!' and then presses the shift button (Shift) twice to thereby set the character input mode as the 'ABC mode'. Here, the 'robot' does not shift because the cursor lies beyond the range within which the word-shifting occurs.

On the other hand, the function of character-shifting is performed by pressing and holding the shift button (Shift) for a few seconds. This function serves to shift characters one at a time, which were inputted beforehand and lie at the left side of the cursor, between the capital letter and the small letter. However, this function does not affect the character input mode-setting. As in a proper noun including an enterprise name, a person name, a place name like 'YouTube', 'NeXT' and etc., it is difficult to shift the character between the capital letter and the small letter with the use of only the function of character input mode-setting and word-shifting, because the capital letter and the small letter are mixed therein. In such case, the corresponding characters may be shifted one at a time. Also, the function of character-shifting makes it possible to shift the characters one at a time while inputting the character and to shift the character inputted beforehand between the capital letter and the small letter. Further, this function may be used within a single word, along with the function of input mode-setting and word-shifting.

As an example of inputting the 'YouTube', the character input mode is set as the 'Abc mode' by pressing the shift button (Shift) once (the function of character input mode-setting and word-shifting), and then 'y', 'o', 'u' and 't' are successively inputted to thereby complete 'Yout'. In that state, the shift button (Shift) is pressed and held for a few seconds to thereby shift 't' to 'T' (the function of character-shifting), and then 'u', 'b' and 'e' are inputted to thereby complete the 'YouTube'.

As the other example of inputting the 'NeXT', the character input mode is set as the 'ABC mode' by pressing the shift button (Shift) twice (the function of character input mode-setting and word-shifting), and then 'n' and 'e' are successively inputted to thereby complete 'NE'. In that state, the shift button is pressed and held for a few seconds to thereby shift 'E' to 'e' (the function of character-shifting), and then 'x' and 't' are inputted to thereby complete 'NeXT'.

As another example of inputting the 'NeXT', the 'next' is inputted first, and then the shift button (Shift) is pressed twice to thereby shift the 'next' to the 'NEXT' of the 'ABC mode' (the function of character input mode-setting and word-shifting). Thereafter, the cursor is moved to the position next to 'E' and then the shift button (Shift) is pressed and held for a few seconds so as to shift 'E' to 'e' (the function of character-shifting). Thereby, the 'NeXT' is completed.

On the other hand, the space button (SP) is assigned to the numeric key (N) for '0' and serves to input the blank when pressing the numeric key (N) for '0' while inputting the alphabets.

Accordingly, if it is required to input the alphabets in the mobile communication terminal like the mobile phone and the PDA using the keypad input (110) as described above, the alphabets are arranged in consideration of the frequency of use of alphabets and the interrelationship of the successive input to thereby enable the successive input operation.

Also, the alphabets assigned to the same button can be conveniently and quickly inputted in succession without awaiting the intermediate time or moving the character place through the manipulation of the directional key.

Also, the shifting of the character and the word between the capital letter and the small letter and the input mode-shifting can be conveniently and quickly attained while inputting the alphabets.

Also, the button that is more frequently used is assigned to the more convenient place in consideration of the hand that the user mainly uses for manipulating the mobile communication terminal, so that the keypad arrangement optimized to the singlehanded manipulation is provided.

Here, with regard to the function keys such as '*' and '#', if the user mainly uses the right hand, the last button (LAST) and the special character button (SC) are assigned to '*', whereas the shift button (Shift) is assigned to '#'. If the user mainly uses the left hand, the shift button (Shift) is assigned to '*', whereas the last button (LAST) and the special character button (SC) are assigned to '#'. In other words, the last button (LAST) and the special character button (SC) having the higher frequency of use are assigned to the position that a corresponding finger can easily approach, so that it is possible to perform the more convenient input of the alphabets.

On the other hand, as the display (120) for displaying the alphabet inputted in the keypad input (110) of the mobile communication terminal, an LCD is preferred, which is well-known display means.

The alphabet combiner (130) serves to read the alphabet corresponding to the input of the keypad input (110) from the pre-stored database (DB) and to provide the display (120) with the read alphabet. As shown in Table 1, the database (DB) stores the data for enabling the alphabet input, the blank input, the special character input, which correspond to the input of the keypad input (110), and the capital/small letter-shifting input. The alphabet combiner (130) serves to combine the alphabet input, the blank input, the special character input and the capital/small letter-shifting input to thereby complete the corresponding alphabets and the special character and display the same on the display (120).

Herein-below, the method of alphabet input in the mobile communication terminal with the arrangement according to a preferred embodiment of the present invention will be described in detail.

Figure 5:
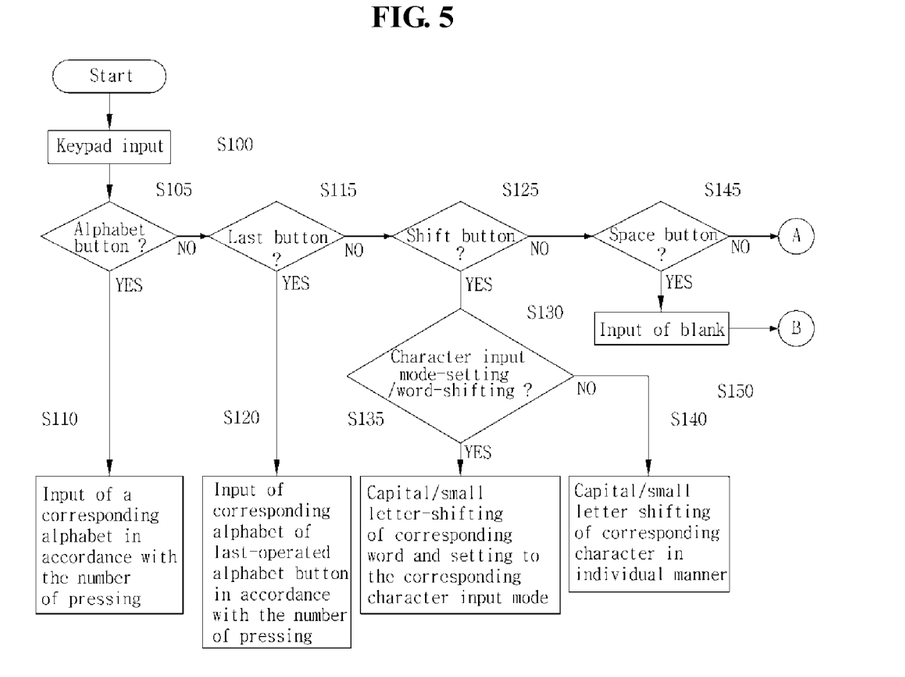
FIGS. 5 and 6 are control flow charts, each of which illustrates a method of inputting alphabet in a mobile communication terminal according to a preferred embodiment of the present invention.
Figure 6:
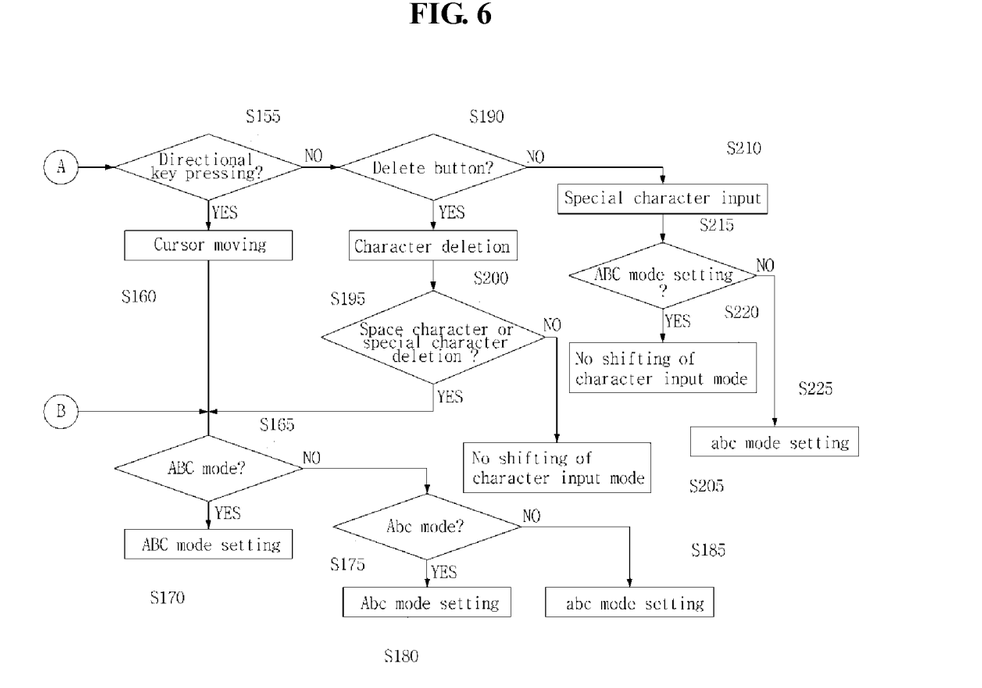

FIGS. 5 and 6 are flow charts illustrating the method of alphabet input in the mobile communication terminal according to the preferred embodiment of the present invention.

As shown in FIGS. 5 and 6, in a state that the alphabet input mode is accessed by the user through a corresponding function key of the mobile communication terminal, a corresponding button is inputted from the keypad input (110) (S100).

If the inputted button is an alphabet button (S) (S105), the alphabet combiner (130) displays the alphabet assigned to the corresponding alphabet button (S) on the display (120) according to the number of pressing the alphabet button (S) (S110).

If the button that was inputted in the step (S105) is the last button (LAST) (S115), the alphabet combiner 130 displays a corresponding alphabet of the last-inputted alphabet button (S) on the display (120) according to the number of pressing the last button (LAST) (S120).

If the button that was inputted in the step (S105) is the shift button (Shift) (S125) and if it is the input corresponding to the function of character input mode-setting and word-shifting (S130), the alphabet combiner (130) shifts a corresponding word between the capital letter and the small letter or displays the alphabets on the display (120) in a corresponding mode (S135).

If the input of the shift button (Shift) in the step (S130) is the input corresponding to the function of character-shifting, the alphabet combiner (130) shifts a corresponding alphabet between the capital letter and the small letter to thereby display the same on the display (120) (S140).

If the button that was inputted in the step (S105) is the space button (SP) (S145), the alphabet combiner (130) displays a blank on the display (120), and then process goes to the step (S165) as described herein-below (S150).

If the button that was inputted in the step (S105) corresponds to the directional key (S155), the alphabet combiner (130) moves the cursor to a character position next to a corresponding alphabet and the process goes to the step (S165) as described herein-below (S160).

Here, the step (S165) is to determine which one of the following three cases occurs when the cursor changes in its position due to the pressing of the space button (SP) or the directional key: (Case 1) a single character at the left side of the cursor and a single character at the right side of the cursor are capital letters; (Case 2) the special character, the space character or the initiation of the text message lies at the left side of the cursor and double characters at the right side of the cursor are the capital letters; and (Case 3) double characters at the left side of the cursor are the capital letters and the special character, the space character and the termination of the text message lies at the right side of the cursor. In other words, the step (S165) is to determine whether it is the situation corresponding to the 'ABC mode'. If the determination result in the step (S165) is the 'ABC mode', the alphabet combiner (130) automatically sets the character input mode as the 'ABC mode' (S170).

If the determination result in the step (S165) is not the 'ABC mode', it is required to determine which one of the following two cases occurs when the cursor changes in its position due to the pressing of the space button (SP) or the directional key: (Case 1) the initiation of the text message lies at the left side of the cursor; and (Case 2) a string located at the left side of the curser is arranged in the order of one of the special characters such as '.', '?' and '!', each of which means the termination of the sentence, followed by one or more of the space characters (S175). In other words, it is required to determine whether it is the situation corresponding to the 'Abc mode'. If the determination result in the step (S175) is the 'Abc mode', the alphabet combiner (130) automatically sets the character input mode as the 'Abc mode' (S180).

Here, if the determination result in the step (S175) is not the 'Abc mode', the alphabet combiner (130) automatically sets the character input mode as the 'abc mode'(S185).

On the other hand, if the button inputted at the step (S105) is the delete button (S190), the alphabet combiner (130) deletes a single alphabet located at the left side of the current cursor (S195) and, at the same time, determines whether the space character or the special character is deleted or not (S200).

Thereafter, if the space character or the special character is deleted in the step (S200), the alphabet combiner (130) performs the step (S165). If the space character or the special character is not deleted while deleting characters, the alphabet combiner (130) does not shift the character input mode setting (S205), because such deletion is limited to a single word, but not to the space character or the special character.

On the other hand, the button inputted in the step (S105) is not the delete button, the alphabet combiner (130) displays the corresponding special character on the display (120) (S210) and, at the same time, determines whether or not the character input mode-setting is the 'ABC mode' (S215). If the determination result in the step (S215) shows that the character input mode is the 'ABC mode', the character input mode-setting does not shift (S220). If the determination result in the step (S215) shows that the character input mode is not the 'ABC mode', the character input mode-setting shifts to the 'abc mode' (S225).

TABLE 4

[Input efficiency related to the number of pressing the keypad]

| Alphabet | FOC | CO | | IN | |
|---|---|---|---|---|---|
| | | NP | PV | NP | PV |
| a | 8.17 | 1 | 8.17 | 1 | 8.17 |
| b | 1.49 | 2 | 2.98 | 2 | 2.98 |
| c | 2.78 | 3 | 8.34 | 3 | 8.34 |
| d | 4.25 | 1 | 4.25 | 2 | 8.50 |
| e | 12.70 | 2 | 25.4 | 1 | 12.70 |
| f | 2.23 | 3 | 6.69 | 2 | 4.46 |
| g | 2.01 | 1 | 2.01 | 3 | 6.03 |
| h | 6.09 | 2 | 12.18 | 2 | 12.18 |
| i | 6.97 | 3 | 20.91 | 1 | 6.97 |
| j | 0.15 | 1 | 0.15 | 2 | 0.30 |
| k | 0.77 | 2 | 1.54 | 3 | 2.31 |
| l | 4.03 | 3 | 12.09 | 2 | 8.06 |
| m | 2.41 | 1 | 2.41 | 3 | 7.23 |
| n | 6.74 | 2 | 13.48 | 1 | 6.74 |
| o | 7.51 | 3 | 22.53 | 1 | 7.51 |
| p | 1.93 | 1 | 1.93 | 2 | 3.86 |
| q | 0.10 | 2 | 0.20 | 3 | 0.30 |
| r | 5.99 | 2 | 11.98 | 1 | 5.99 |
| s | 6.33 | 3 | 18.99 | 1 | 6.33 |
| t | 9.06 | 1 | 9.06 | 1 | 9.06 |

TABLE 4-continued

[Input efficiency related to the number of pressing the keypad]

| Alphabet | FOC | CO | | IN | |
|---|---|---|---|---|---|
| | | NP | PV | NP | PV |
| u | 2.76 | 2 | 5.52 | 1 | 2.76 |
| v | 0.98 | 3 | 2.94 | 3 | 2.94 |
| w | 2.36 | 1 | 2.36 | 2 | 4.72 |
| x | 0.15 | 2 | 0.30 | 3 | 0.45 |
| y | 1.97 | 3 | 5.91 | 2 | 3.94 |
| z | 0.07 | 3 | 0.21 | 3 | 0.21 |
| Sum of proportional value | | | 202.53 | | 143.04 |

[Remark]
FOC: frequency ratio of use
CO: the conventional art
IN: the present invention
NP: the number of pressing
PV: Proportional value Table 4 shows proportional values and a sum of the proportional values in the conventional art and the present invention, wherein the proportional value is obtained by multiplying the frequency ratio of use of each alphabet character by the number of pressing and wherein the input efficiency relative to the number of pressing the keypad may be reviewed. Assuming that every alphabet character is inputted by pressing the button once, such corresponds to 100%. However, the conventional art shows the result of 202.53%, whereas the present invention of 143.04%. In other words, if it is possible to input every alphabet character by pressing the button only once, one hundred alphabet characters can be inputted by pressing the button 100 times. However, the conventional art requires 203 times of the button-pressing, whereas the present invention requires 143 times of the button-pressing. The result of the conventional art does not take the matter regarding the intermediate time or the directional key-inputting into account, and thus, the number of the button-pressing more than 203 times will be valid in reality.

In the alphabet input manners of the present invention and the conventional art, an example of inputting the same sentence is illustrated in Table 5 herein-below.

TABLE 5

[Comparison of sentence composition in alphabet input manners of the present invention and the conventional art]

| Input manner | Sentence | Keypad input ['>' means the directional key or the intermediate time and is not taken into account in the summation of the number of pressing. '(0)' means the space button] | The number of pressing | Total number of pressing |
|---|---|---|---|---|
| Conventional | FIGO | 333444>4666 | 10 | 69 |
| | a special permission | 2(0)777>7332224442555(0)733776444777>777444666>66 | 42 | |
| | i am a boy | 444(0)26(0)2(0)22666999 | 17 | |
| The present invention | FIGO | 2242225 | 7 | 48 |
| | a special permission | 1(0)85521114166(0)552366648*456 ['*' means the last button] | 27 | |
| | i am a boy | 4(0)1666(0)1(0)11599 | 14 | |

As shown in Table 5, the alphabet input manner of the mobile communication terminal, which has the keypad arrangement optimized to the singlehanded use according to the present invention, makes it possible to quickly input the alphabet with a considerably fewer number of the button-pressing, when it is compared to the alphabet input manner of the prior art.

As described herein above, if it is required to input the alphabet in the mobile communication terminal like the mobile phone, the PDA and etc., the present invention provides the keypad with the arrangement of the alphabet button (S) in consideration of the frequency of use of the alphabet and the interrelationship of the successive input, so that the successive and fast input manipulation of the alphabet is possible.

Also, with the use of the last button (LAST), it is possible to successively input the alphabets assigned to the same button in an easy and fast manner without moving to other place for the character through the awaiting of the intermediate time or the manipulation of the directional key.

Also, with the use of the shift button (Shift), it is possible to simply and quickly perform the capital/small letter-shifting for the word or the character and the input mode-shifting while inputting the alphabets, without deleting and re-inputting the character.

Also, the last button (LAST) and the shift button (Shift) are assigned to '*' or '#' of the function keys in such a manner that a mainly used-button is assigned to a more convenient place of the keypad, depending on which hand the user mainly uses for manipulating the mobile communication terminal, so that the keypad arrangement optimized to the singlehanded use may be provided.

While the present invention has been shown and described with reference to certain exemplary embodiments thereof, it will be understood by those skilled in the art that various changes in form and details may be made therein without departing from the spirit and scope of the invention as defined by the appended claims. Therefore, each of the embodiments described herein above should be regarded as being a illustrative one, but not a restrictive one.

What is claimed is:

1. An alphabet input device of a mobile communication terminal comprising:
    a keypad input including a plurality of keys for inputting alphabets;
    a display for displaying alphabets inputted by said keypad input;
    an alphabet combiner for reading the alphabet corresponding to the input of the keypad input from pre-stored database and providing the display with said alphabet from said database; and,
    a controller coupled to said keypad input, said display and said alphabet combiner so as to control thereof,
    wherein said keypad input has a 3.times.4 matrix which includes numeric keys distinguished by the numbers '0' to '9' and function keys distinguished by the characters '*' and '#', and said numeric keys for '1' to '9' are assigned with a plurality of alphabet buttons for inputting alphabets,
    wherein said numeric key for '0' is assigned with a space button for inputting a blank,
    wherein one of said function keys for '*' and '#' is assigned with a last button for successive input of the alphabet and a special character button for input of a special character,
    wherein the other of said function keys that does not assigned with said last button and said special character button is assigned with a shift button, which performs a function of character input mode-setting and word-shifting for setting a character input mode so as to allow input of the capital/small letter of alphabet and for shifting a word inputted beforehand between the capital letter and the small letter, and a function of character-shifting for shifting characters inputted beforehand one at a time,
    wherein said shift button is assigned to the other of the function keys that is not assigned with the last button and the special character button and,
    wherein said shift button performs: the function of character input mode-setting and word-shifting, in which the character input mode is set for enabling the input of a capital/small letter of the alphabet and in which a word inputted beforehand is shifted between the capital letter and the small letter; and the function of character-shifting, in which characters inputted beforehand are shifted between the capital letter and the small letter one at a time, and
    wherein said function of character input mode-setting and word-shifting includes three modes, such as an 'abc mode' in which all the characters are displayed as the small letter, an 'Abc mode' in which an initial character of a word is displayed as the capital letter, but other characters are displayed as the small letter, and an 'ABC mode' in which all the characters are displayed as the capital letter,
    wherein said 'abc mode' is set as a default mode and said 'Abc mode' is set at the beginning of the text message,
    wherein said three modes circulates in the order of the 'abc mode or the default setting'→the 'Abc mode'→the 'ABC mode'→the 'abc mode'→the 'Abc mode'→the 'ABC mode'→the 'abc mode' as the shift button is pressed,
    wherein when the shift button is pressed, the character input mode is set as a corresponding mode, so that the cursor awaits the character input so as to input a new input-character according to the corresponding mode and if the cursor is positioned within a range of a word inputted beforehand, the word is shifted according to the corresponding mode, and
    wherein regardless of whether the shift button is pressed before, after or during inputting the word, the word shifts according to the corresponding mode, and the word-shifting is possible by pressing the shift button when the cursor is moved to the position of the corresponding word.

2. An alphabet input device of a mobile communication terminal as claimed in claim 1,
    wherein said plurality of the alphabet buttons are such that:
    said numeric key for '1' is assigned with 'A', 'B' and 'C', so that A, B, C and 'CA' are inputted according to the number of pressing;
    said numeric key for '2' is assigned with the alphabets 'E', 'F' and 'G', so that 'E', 'F', 'G' and 'GE' are inputted according to the number of pressing;
    said numeric key for '3' is assigned with the alphabets 'R', 'D' and 'X', so that 'R', 'D' and 'X' are inputted according to the number of pressing;
    said numeric key for '4' is assigned with the alphabets 'I', 'J' and 'K', so that 'I', 'J', 'K' and 'KI' are inputted according to the number of pressing;
    said numeric key for '5' is assigned with the alphabets 'O', 'P' and 'Q', so that 'O', 'P' and 'Q' are inputted according to the number of pressing;
    said numeric key for '6' is assigned with the alphabets 'N', 'L' and 'M', so that 'N', 'L', 'M' and 'LL' are inputted according to the number of pressing;
    said numeric key for '7' is assigned with the alphabets 'T' and 'H', so that 'T', 'H', 'TH' and 'HT' are inputted according to the number of pressing;
    said numeric key for '8' is assigned with the alphabets 'S', 'W' and 'V', so that 'S', 'W' and 'V' are inputted according to the number of pressing; and
    said numeric key for '9' is assigned with the alphabets 'U', 'Y' and 'Z', so that 'U', 'Y' and 'Z' are inputted according to the number of pressing.

3. An alphabet input device of a mobile communication terminal as claimed in claim 1,
    wherein said space button is assigned to said numeric key for '0', so that a blank is inputted when inputting the numeric key for '0' during the alphabet input.

4. An alphabet input device of a mobile communication terminal as claimed in claim 1,
    wherein said last button is assigned to one of said function keys for '*' and '#', memorizes a last-operated alphabet button and inputs a corresponding alphabet of the last-operated alphabet button in accordance with the number of pressing the last button when the user presses the last button.

5. An alphabet input device of a mobile communication terminal as claimed in claim 1,
wherein said special character button is assigned to the function key that is assigned with said last button and wherein said special character button causes a corresponding special character window to open when said function key is pressed and held for a few seconds.

6. An alphabet input device of a mobile communication terminal as claimed in claim 4,
wherein if said keypad input is displayed on said display in a software manner, said last button is not displayed as "LAST", but has the same representation as the button memorized in said last button.

7. An alphabet input device of a mobile communication terminal as claimed in claim 1,
wherein in said function of character input mode-setting and word-shifting by said shift button, the range of the word determined as positioning the cursor within the range of the word inputted beforehand is from a place behind the first character of a word to a place behind the last character, and a place before the first character is excluded from the range so as to prepare for the case in that a new word is inserted in front of an existing word, and
wherein each word is separated by a space character, and if a special character is used in the middle of the word constituted by the alphabets, the word is regarded as being separated into each word by the special character.

8. An alphabet input device of a mobile communication terminal as claimed in claim 1,
wherein in said function of character input mode-setting and word-shifting by said shift button, it provides a function of automatically setting the character input mode in accordance with a situation at the left/right side of the cursor when a position of the cursor changes due to pressing of the space button or the directional key,
wherein if there occurs any one of the following three cases: (Case 1) a single character at the left side of the cursor and a single character at the right side of the cursor are the capital letters; (Case 2) double characters at the left side of the cursor are the capital letters and the special character, the space character or the termination of the text message lies at the right side of the cursor; (Case 3) the special character, the space character or the initiation of the text message lies at the left side of the cursor and double characters at the right side of the cursor are capital letters, the character input mode is automatically set as the 'ABC mode' and the word does not shift,
wherein if there occurs any one of the following two cases: (Case 1) left side of the cursor corresponds to the initiation of the text message; and (Case 2) a string located at the left side of the cursor is arranged in the order of one of the special characters such as '.', '?' and '!', each of which means the termination of the sentence, followed by one or more of the space characters, then the character input mode is automatically set as the 'Abc mode' and the word does not shift,
wherein if the case of setting as the 'ABC mode' and the case of setting as the 'Abc mode' occur at the same time, the 'ABC mode' is preferentially applied, wherein if neither the case of setting as the 'ABC mode' nor the case of setting as the 'Abc mode' occurs, it is automatically set as the 'abc mode' and the word does not shift.

9. An alphabet input device of a mobile communication terminal as claimed in claim 1,
wherein in said function of character input mode-setting and word-shifting by said shift button, the character input mode-setting does not shift when the character is deleted and the position of the cursor is changed due to pressing of the delete button, because such is the deletion of the character within the word before deleting the space character or the special character,
wherein when one or more of the space characters or the special characters are deleted and the position of the cursor is changed due to successive pressing of the delete button, a function of automatically setting the character input mode in accordance with a situation at the left/right side of the cursor changed is provided,
wherein if there occurs any one of following three cases: (Case 1) a single character at the left side of the cursor and a single character at the right side of the cursor are the capital letters; (Case 2) double characters at the left side of the cursor are the capital letters and the space character, the special character, or the termination of the text message lies at the right side of the cursor; and (Case 3) the space character, the special character or the initiation of the text message lies at the left side of the cursor and double characters at the right side of the cursor are capital letters, the character input mode is automatically set as the 'ABC mode' and the word does not shift,
wherein if there occurs any one of following two cases: (Case 1) left side of the cursor corresponds to the initiation of the text message; and (Case 2) a string located at the left side of the cursor is arranged in the order of one of the special characters such as '.', '?' and '!', each of which means the termination of the sentence, followed by one or more of the space characters, then the character input mode is automatically set as the 'Abc mode' and the word does not shift,
wherein if the case of setting as the 'ABC mode' and the case of setting as the 'Abc mode' occur at the same time, the 'ABC mode' is preferentially applied,
wherein if any one of the above cases does not occur even when one or more of the space characters or the special characters are deleted and the position of the cursor is changed due to successive pressing of the delete button, then the character input mode is automatically set as the 'abc mode' and the word does not shift,
wherein the successive pressing of the delete button corresponds to the case in that only the delete button is successively pressed without other button being pressed and,
wherein it is determined as the successive pressing of the delete button if there is not any manipulation of other button in spite of the occurrence of the interval during the successive input.

10. An alphabet input device of a mobile communication terminal as claimed in claim 1,
wherein said function of character input mode-setting and word-shifting by said shift button is such that when the special character is inputted, the character input mode does not shift in its setting if the character input mode is set as the 'ABC mode', whereas the character input mode is automatically set as the 'abc mode' in all other cases, so that the word does not shift.

11. An alphabet input device of a mobile communication terminal as claimed in claim 1,
wherein said function of character-shifting by said shift button is to shift a single character, which is positioned at just left of the cursor and which is inputted beforehand, between the capital letter and the small letter when said shift button is pressed and held for a few seconds.

12. A method of inputting alphabet of a mobile communication terminal, said mobile communication terminal comprising:
a keypad input including a plurality of keys for inputting alphabets; a display for displaying alphabets inputted by said keypad input; an alphabet combiner for reading the alphabet corresponding to the input of the keypad input from pre-stored database and providing the display with said alphabet from said database; and, a controller coupled to said keypad input, said display and said alphabet combiner so as to control thereof,
wherein said keypad input has a 3×4 matrix which includes numeric keys distinguished by the numbers '0' to '9' and function keys distinguished by the characters '*' and '#', and said numeric keys for '1' to '9' are assigned with a plurality of alphabet buttons for inputting alphabets, wherein said numeric key for '0' is assigned with a space button for inputting a blank, wherein one of said function keys for '*' and '#' is assigned with a last button for successive inputting of the alphabet and a special character button for inputting special character, wherein the other of said function keys that does not assigned with said last button and said special character button is assigned with a shift button, which performs a function of character input mode-setting and word-shifting for setting a character input mode so as to allow inputting of the capital/small letter of alphabet and for shifting a word inputted beforehand between the capital letter and the small letter, and a function of character-shifting for shifting characters inputted beforehand one at a time,
said method comprising steps of:
a first step wherein said numeric key for '1' is assigned with 'A', 'B' and 'C', so that 'A', 'B', 'C' and 'CA' are inputted according to the number of pressing; said numeric key for '2' is assigned with the alphabets 'E', 'F' and 'G', so that 'E', 'F', 'G' and 'GE' are inputted according to the number of pressing; said numeric key for '3' is assigned with the alphabets 'R', 'D' and 'X', so that 'R', 'D' and 'X' are inputted according to the number of pressing; said numeric key for '4' is assigned with the alphabets 'I', 'J' and 'K', so that 'I', 'J', 'K' and 'KI' are inputted according to the number of pressing; said numeric key for '5' is assigned with the alphabets 'O', 'P' and 'Q', so that 'O', 'P' and 'Q' are inputted according to the number of pressing; said numeric key for '6' is assigned with the alphabets 'N', 'L' and 'M', so that 'N', 'L', 'M' and 'LL' are inputted according to the number of pressing;
said numeric key for '7' is assigned with the alphabets 'T' and 'H', so that 'T', 'H', 'TH' and 'HT' are inputted according to the number of pressing; said numeric key for '8' is assigned with the alphabets 'S', 'W' and 'V', so that 'S', 'W' and 'V' are inputted according to the number of pressing; and said numeric key for '9' is assigned with the alphabets 'U', 'Y' and 'Z', so that 'U', 'Y' and 'Z' are inputted according to the number of pressing;
a second step of inputting a corresponding alphabet of a last-operated alphabet button in accordance with the number of pressing the last button when pressing the last button that is assigned to one of said function keys for '*' and '#';
a third step of shifting the alphabet or the word between the capital letter and the small letter and inputting thereof when the input of the shift button, which is assigned to the other of the function keys that is not assigned with the last button, corresponds to the function of the character input mode-setting and the word-shifting;
a fourth step of individually shifting the alphabet at the left of the current cursor between the capital letter and the small letter when the input of the shift button corresponds to the function of the character-shifting;
a fifth step of executing a function of a blank-inputting when inputting the space button that is assigned to the numeric key for '0';
a sixth step of displaying a special character collection window when pressing and holding the special character button, for a few seconds, and causing a corresponding special character to be inputted when pressing a numeric key corresponding to one in the special character collection window, the special character button being assigned to one of said function keys for '*' and '#' along with the last button.

13. A method of inputting alphabet of a mobile communication terminal as claimed in claim 12,
wherein when the cursor moves due to the input of said blank, the pressing of directional key or the delete button, the character input mode is set as the 'ABC mode' if there occurs any one of following three cases: (Case 1) a single character at the left side of the cursor and a single character at the right side of the cursor are the capital letters; (Case 2) the special character, the space character or the initiation of the text message lies at the left side of the cursor and double characters at the right side of the cursor are capital letters; and (Case 3) double characters at the left side of the cursor are the capital letters and the special character, the space character or the termination of the text message lies at the right side of the cursor;
the character input mode is set as the 'Abc mode' if there occurs any one of the following two cases: (Case 1) the left side of the cursor corresponds to the initiation of the text message; and (Case 2) a string located at the left side of the cursor is arranged in the order of one of the special characters such as '.', '?' and '!', each of which means the termination of the sentence, followed by one or more of the space characters and,
the character input mode is set as the 'abc mode' in other cases.

14. A method of inputting alphabet of a mobile communication terminal as claimed in claim 13,
wherein when the special character is inputted, the character input mode is automatically set as the 'abc' mode if the character input mode is not set as the 'ABC mode'.

* * * * *